United States Patent Office 2,983,736
Patented May 9, 1961

2,983,736
PROCESS FOR THE PREPARATION OF 20-ALKYL-AMINO STEROID DERIVATIVES AND NOVEL 20-ALKYLAMINO STEROID DERIVATIVES PREPARED THEREBY
Vlasios Georgian, Evanston, Ill., and James F. Kerwin, Broomall, and Manfred E. Wolff, Elkins Park, Pa., assignors to Smith Kline & French Laboratories, Philadelphia, Pa., a corporation of Pennsylvania
No Drawing. Filed June 19, 1959, Ser. No. 821,348
16 Claims. (Cl. 260—397.45)

This invention relates to a process for the preparation of 20-alkylamino steroid derivatives and to novel 20-alkylamino steroid derivatives prepared thereby. The 20-alkylamino compounds prepared by the process of this invention are useful as intermediates in the preparation of 18,20-oxygenated steroids which have valuable therapeutic activity.

More specifically, the 20-alkylamino steroids prepared by the process of this invention are useful as intermediates in the preparation of 18→20 pyrrolidines (conanines) which are converted into 18,20-oxygenated steroids. The C–18 oxygen functionalized steroids have recently gained importance as blockers of aldosterone, the principal hormone responsible for sodium retention. Several clinical disorders such as cirrhosis, nephrosis and congestive heart failure lead to sodium retention and edema, and are associated with increased secretion of aldosterone. C–18 oxygenated steroids in blocking the effects of aldosterone increase sodium excretion leading to a diuretic action and thereby are useful therepeutic agents. C–18 oxygenated steroids prepared through this invention also are useful in the synthesis of aldosterone-like compounds. In addition, the close relationship of the C–18 oxygenated steroids prepared from the intermediates of this invention to the known adrenocortical and sex hormones ascribe to the former compounds some of the latter's pharmacological effects such as anti-inflammatory and anabolic properties.

It is an object of this invention to provide 20-alkylamino steroids from the corresponding 20-ketones by a one step reductive amination process. This process is considerably more advantageous than the three or four step processes available in the literature for the production of 20-amino steroids. Further, the process of this invention is advantageous in that it can be practiced in the presence of an 11-keto group or a 5,6 double bond.

It is a further object of this invention to provide readily accessible novel 20-alkylamino steroid derivatives, particularly 11-oxygenated-20-alkylamino steroids.

Another object of this invention is to provide 20-alkylamino steroid intermediates useful in the preparation of biologically active 18,20-oxygenated steroids.

These and other objects of this invention will become more apparent from the following description. It is desired to point out that the structural formulae depicted here and in the claims are intended to cover substituents in the α or β position and steroids with an A/B cis or A/B trans juncture.

The process of this invention for the preparation of 20-alkylamino steroids is schematically represented as follows:

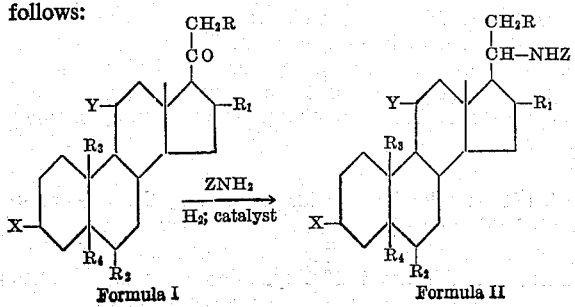

when:

X represents hydrogen, hydroxy or acyloxy;
Y represents hydrogen, hydroxy, acyloxy or keto;
R and $R_4$ represent hydrogen, hydroxy or acyloxy;
$R_1$ and $R_2$ represent hydrogen, hydroxy, acyloxy or methyl;
$R_3$ represents hydrogen or methyl; and
Z represents lower alkyl.

Where used herein the term acyl is used to denote an organic hydrocarbon carboxylic acid radical having not more than 6 carbon atoms such as alkanoyl, for example acetyl, trifluoroacetyl or hemisuccinyl; and the term lower alkyl is used to denote an aliphatic hydrocarbon group having not more than 6 carbon atoms. The term conanine is used herein generically to include the 20α or 20β and the 5α or 5β configurations, as well as N-lower alkyl derivatives.

The 20-alkylamino steroids of Formula II are prepared as shown above from the corresponding 20-keto steroids by reductive amination in accordance with the novel process of this invention. In this process, the 20-keto steroid is hydrogenated in the presence of a primary lower alkyl amine having not more than 6 carbon atoms and a hydrogenation catalyst. Advantageously, the 20-keto steroid suspended or dissolved in a solution of the lower alkyl amine dissolved in an unreactive organic solvent such as dioxane or preferably a lower alkanol having from 1 to 4 carbon atoms, for example ethanol or methanol, and the hydrogenation catalyst are shaken at a low pressure of hydrogen such as from about 1 to 5 atmospheres at a temperature in the range of from about ambient room temperature or about 25° C. to about 50° C., preferably at about room temperature, until the theoretical amount of hydrogen is absorbed, i.e., one molar equipalent. In carrying out this process, advantageously an excess of the lower alkyl amine, for example from 5 to 20 moles excess, is employed, preferably methyl amine. Exemplary of suitable hydrogenation catalysts are the group of platinum and nickel catalysts, for example platinum oxide or Raney nickel, used in an amount of from about 1 to 10% by weight of the steroid. The preferred catalyst is platinum oxide.

The product is isolated from the reaction mixture by filtering off the catalyst and evaporating the filtrate to dryness. The residue comprises the crude 20α- and 20β-alkylamines of Formula II. The product is purified advantageously by treatment with acid to remove all non-basic material. For example, the residue is dissolved in a solvent such as ether and hydrogen chloride gas is passed into the solution. The hydrochloric salt is dissolved or suspended in an inert organic solvent such as methylene chloride or methanol and treated with a dilute alkali solution such as an alkali metal hydroxide or carbonate for instance 5% sodium carbonate solution or 10% sodium hydroxide solution. The organic layer containing the free base is dried and evaporated to give a mixture of 20α- and 20β-alkylamines which are separated by fractional recrystallization.

Alternatively, the residual mixture of 20-alkylamines following liberation from the hydrochloride salts as described above are dissolved in ethanol and treated to pH 2 with a saturated ethanolic solution of picric acid. The 20α-alkylamine free base is then isolated from the picrate salt by shaking with ether and 10% sodium hydroxide.

The 20α-alkylamino steroids are also isolated by dissolving the crude reaction product in a solvent such as chloroform and extracting the solution with dilute mineral acid such as hydrochloric acid, or dilute acetic acid. The acid extracts are made basic with dilute alkali to give the solid free base.

In the above described process, 20-keto steroids having either an acyloxy or hydroxy moiety substituted in the steroid nucleus are employed satisfactorily. Optionally, in lieu of starting with a hydroxy substituted steroid, the corresponding acyloxy steroid is reductively aminated and the product obtained is converted to the hydroxy steroid. The crude residue of acyloxy steroid after hydrogenation is dissolved in for example ethanol and at least one mole equivalent of potassium hydroxide is added. The solution is heated at reflux for about thirty minutes, cooled, diluted with water and filtered. Recrystallization of the solid thus obtained affords the corresponding hydroxy 20α-alkylamino steroid.

Alternatively, the 20-alkylamino steroids are prepared from the corresponding 5,6-unsaturated 20-keto steroids as follows:

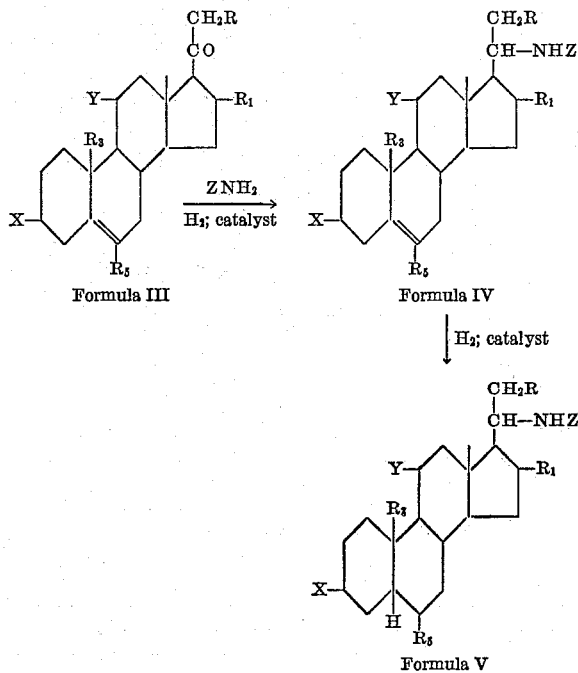

when:

X, Y, R, $R_1$, $R_3$ and Z are as defined above for Formulae I and II; and
$R_5$ represents hydrogen or methyl.

Thus, the unsaturated 20-keto steroid is reductively aminated according to the process described above to give the unsaturated 20-alkylamino steroid which is then hydrogenated to the corresponding saturated derivative. In carrying out the final hydrogenation step known methods are employed. For example, the 5,6-unsaturated 20-alkylamino steroid is dissolved in acetic acid and hydrogenated under from 1–5 atmospheres of hydrogen in the presence of a suitable catalyst such as palladium.

The 20-keto steroids corresponding to Formulae I and III above used as starting materials in the process for the preparation of 20-alkylamino steroids are either known compounds or readily prepared from available precursors by methods known to the art. Exemplary of standard procedures are hydrolysis of an epoxide ring to give an hydroxy substituent, oxidation of an hydroxy substituent to keto, acylation of an hydroxy substituent to acyloxy, reaction of an epoxide ring with methyl magnesium iodide to give adjacent hydroxy and methyl substituents, and so forth.

It is obvious from the above description that the novel process of this invention affords a rapid and simple route for the preparation of 20-alkylamino steroids in good yields. A further advantage of the process of this invention is the availability of a synthetic route to 20-alkylamino steroids with an 11-oxygen function and/or 5,6-unsaturation. Also, it is obvious to one skilled in the art that the 20-alkylamino steroids of Formula II above can be converted to other derivatives. For example, the 3-hydroxy 20-alkylamino steroids are oxidized by standard procedures such as chromic oxide and acetic acid or pyridine, to the corresponding 3-keto derivatives.

The novel 20-alkylamino steroids now made available for the first time by the process of this invention are represented by the following structural formulae:

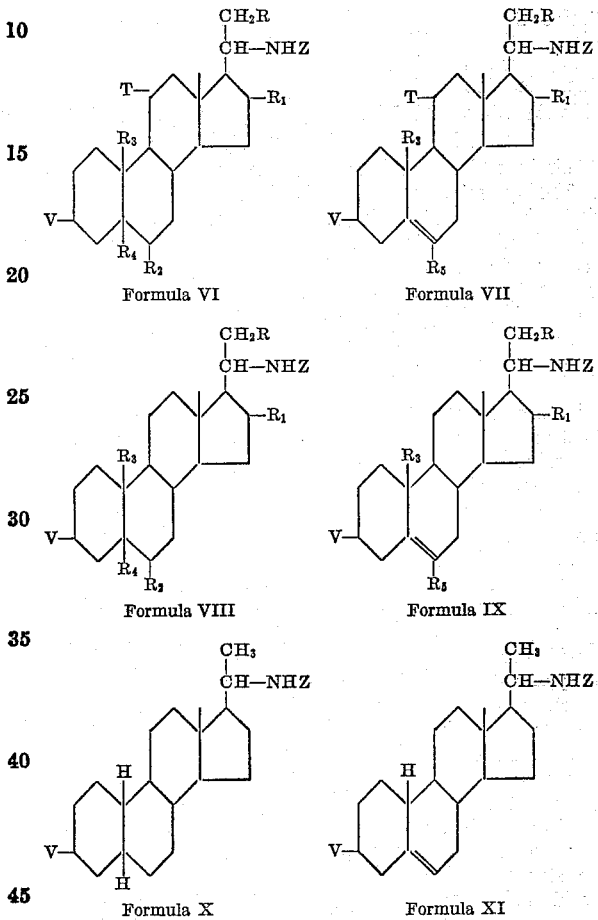

In the above Formulae VI through XI,

V represents hydroxy or acyloxy;
T represents keto, hydroxy or acyloxy;
R and $R_4$ represent hydrogen, hydroxy or acyloxy;
$R_1$ and $R_2$ represent hydrogen, hydroxy, acyloxy or methyl;
$R_3$ and $R_5$ represent hydrogen or methyl; and
Z represents lower alkyl.

In the above Formulae VIII and IX at least one of the substituents R, $R_1$, $R_2$, $R_4$ and $R_5$ is other than hydrogen. It will be noted that the above specific Formulae VI through XI are encompassed by the more generic Formulae II and IV.

Particularly advantageous novel compounds are the 11-oxygenated 20-alkylamino steroids represented by Formulae VI and VII above, especially Formula VI, when:

V represents hydroxy or acyloxy;
T represents keto, hydroxy or acyloxy;
R represents hydrogen, hydroxy or acyloxy;
$R_1$, $R_2$, $R_4$ and $R_5$ represent hydrogen;
$R_3$ represents hydrogen or methyl, preferably methyl; and
Z represents methyl.

The 20-alkylamino steroids prepared by the novel process of this invention are useful as intermediates in the preparation of 18,20-oxygenated steroids. Particularly useful are the novel 20-alkylamino steroids set forth above. The following reaction sequence will serve to illustrate the utility of the 20-alkylamino steroids. It will be appreciated that in several of the steps outlined where alkali is employed an acyloxy moiety is hydrolyzed to hydroxy which is acylated again at that point or in the final product.

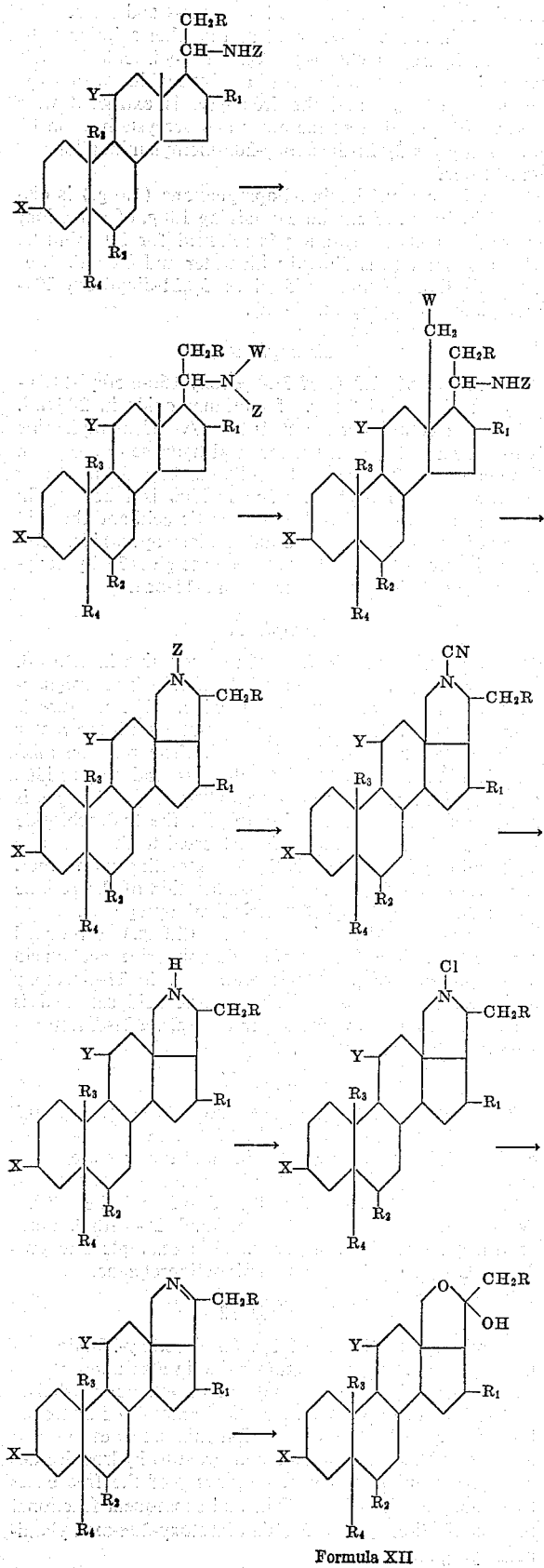

Formula XII when:

X represents hydrogen, hydroxy or acyloxy;
Y represents hydrogen, acyloxy or keto;
R represents hydrogen, hydroxy or acyloxy;
$R_1$ and $R_2$ represent hydrogen, hydroxy, acyloxy or methyl;
$R_3$ represents hydrogen or methyl;
$R_4$ represents hydrogen or acyloxy;
Z represents lower alkyl; and
W represents chlorine or bromine.

As outlined above, the 20-alkylamino steroid is treated with a halogenating agent such as N-chlorosuccinimide, hypochlorous acid, sodium hypochlorite or N-bromosuccinimide to give the 20-(N-chloro or N-bromo amine) which is irradiated with ultraviolet light, advantageously in the presence of trifluoroacetic acid. The use of trifluoroacetic acid in the irradiation step is preferred because of the surprising solubility and stability of the steroid compounds therein, particularly the oxygenated steroids. Further, use of trifluoroacetic acid results in excellent yields of the ring closed conanine derivative upon treatment of the 18-halo intermediate with alkali metal hydroxide such as potassium hydroxide.

The N-alkyl conanine derivative is then treated with cyanogen bromide to give the N-cyano derivative and the cyano group is removed with alkali such as potassium hydroxide. The free N-hydrogen derivative is treated with a halogenating agent such as N-chlorosuccinimide or sodium hypochlorite to give the N-chloro compound. The latter compound is then dehydrohalogenated with for example a base such as sodium methoxide or methanolic potassium hydroxide and the nitrogen removed from the resulting unsaturated derivative by reaction with nitrous acid to give the 18,20-oxygenated steroid of Formula XII. These 18,20-oxygenated steroids derivatives prepared from the 20-alkylamino steroid intermediates obtained by the process of this invention are valuable therapeutic agents being useful as diuretic, anti-inflammatory and anabolic agents.

The following examples will serve to illustrate the novel process of this invention, the compounds prepared thereby and the utility of these compounds as intermediates in the preparation of the therapeutically valuable 18,20-oxygenated steroid derivatives.

*Example 1*

To a solution of methylamine in 200 ml. of ethanol (11.0–12.0 g. per 100 ml.) is added 18.0 g. of 3β-acetoxy-20-allopregnanone and 0.5 g. of platinum oxide catalyst. The resulting mixture is hydrogenated on the Parr apparatus for six and one-half hours, at which time the theoretical amount of hydrogen is absorbed. The reaction mixture is heated, filtered and the filtrate evaporated to dryness. The residue of crude 20-methylamines is dissolved in ether and hydrogen chloride gas is passed into the solution. The hydrochloride salt is collected and converted to the free amine by taking it up in methylene chloride and washing with 5% sodium carbonate solution and then water. The organic layer is dried and evaporated to give a mixture of 20α- and 20β-methylamines. Recrystallization from acetone yields 3β-acetoxy-20α-methylaminoallopregnane, M.P. 167.5–168.5° C.

*Example 2*

The residue of crude 20-methylamines obtained after hydrogenation as described in Example 1 is dissolved in alcohol and potassium hydroxide is added. Approximately 5 ml. of alcohol and 0.5 g. of potassium hydroxide are used per gram of 3-acetoxy compound. The resulting solution is heated at reflux for 30 minutes, cooled, diluted with water and filtered. The solid is recrystallized from ethanol to give 3β-hydroxy-20α-methylaminoallopregnane, M.P. 206–212° C.

The mother liquors are evaporated and the solid obtained is purified via the hydrochloride salt according to the procedure described in Example 1 to give a mixture of 20α- or 20β-amines.

Example 3

A solution of 2.8 g. of 3α-hydroxypregnan-20-one in 50 ml. of ethanol containing 10% w/w of methylamine is shaken under hydrogen in the presence of 200 mg. of platinum oxide until the theoretical amount of hydrogen is absorbed. The turbid mixture is clarified with ethanol, filtered and evaporated in vacuo. The residue is recrystallized to give colorless tetragonal prisms of 3α-hydroxy-20-methylaminopregnane, M.P. 180–205° C.

Example 4

A suspension of 4.2 g. of 20-allopregnanone in 100 ml. of ethanol containing 10% w/w of methylamine is shaken under hydrogen in the presence of 0.3 g. of platinum oxide until the theoretical hydrogen absorption has occurred. The filtered solution is evaporated to an oil which is dissolved in ether and treated with ethereal hydrogen chloride to give the hydrochloride salt. The salt is shaken with 100 ml. of 10% sodium hydroxide solution and 100 ml. of ether until dissolved. The separated ether layer is washed, dried and evaporated. The residue is dissolved in 25 ml. of ethanol, treated to pH 2 with a saturated ethanolic solution of picric acid and the resulting picrate is recrystallized from methanol, M.P. 251–252° C. (d.). The picrate is shaken with ether and 10% sodium hydroxide to give the pure free base, 20α-methylaminoallopregnane, M.P. 94–95° C.

Example 5

To a solution of 16–18 g. of methylamine in 200 ml. of ethanol is added 15.8 g. of 3β-hydroxy-5-pregnen-20-one and 0.5 g. of platinum oxide. The mixture is hydrogenated on the Parr apparatus for seven hours, at which time one mole of hydrogen is absorbed. Methylene chloride is added to the mixture to dissolve the product, the catalyst is removed by filtration and filtrate evaporated to dryness. The residue is taken up in chloroform and extracted with 5% acetic acid. The acid extract is made basic with sodium hydroxide and the free amine isolated. Recrystallization from aqueous methanol yields 3β-hydroxy-20α-methylamino-5-pregnene, M.P. 221–223° C.

Example 6

A mixture of 16.7 g. of 3α,11β-dihydroxypregnan-20-one and 0.5 g. of platinum oxide in 200 ml. of ethanol containing 10% w/w of methylamine is hydrogenated until the theoretical amount of hydrogen is absorbed. The reaction mixture is filtered and the filtrate evaporated to dryness. The residue is dissolved in ether and the solution treated with hydrogen chloride gas. The resulting hydrochloride salt is shaken with a methylene chloride-dilute sodium hydroxide solution. The organic layer is separated, dried and then evaporated to give the 20α- and 20β-methylamines. Fractional recrystallization affords the 3α,11β-dihydroxy-20α-methylaminopregnane.

Similarly, 16.7 g. of 3β,11α-dihydroxy-20-allopregnanone is hydrogenated as described above to yield 3β,11α-dihydroxy-20α-methylaminoallopregnane.

Example 7

3α,11α-diacetoxypregnan-20-one (4.2 g.) and 0.2 g. of platinum oxide are added to a solution of 5.0 g. of methylamine in 50 ml. of ethanol and the mixture is shaken under hydrogen until the theoretical amount of hydrogen is absorbed. The filtered reaction mixture is evaporated to dryness and the residual 20α- and 20β-methylamines are purified as described in Example 1 via the hydrochloride salts. The resulting free bases are recrystallized to give 3α,11α-diacetoxy-20α-methylaminopregnane.

Example 8

To a solution of 10.0–12.0 g. of methylamine in 100 ml. of ethanol is added 8.6 g. of 3β,21-diacetoxy-11,20-allopregnanedione and 0.3 g. of platinum oxide. The mixture is hydrogenated on the Parr apparatus until the theoretical amount of hydrogen is absorbed. The filtered reaction mixture is evaporated to dryness and the residue taken up in ether. Treatment of the ether solution with ethereal hydrogen chloride gives the hydrochloride salt which is converted to the free base by shaking with 10% sodium hydroxide and the free base is extracted with ether. Evaporation of the ether and recrystallization of the solid gives 3β,21-diacetoxy-20α-methylaminoallopregnan-11-one.

The above methylaminoallopregnanone (1.0 g.) is dissolved in 10 ml. of ethanol containing 1.0 g. of potassium hydroxide and the solution is refluxed for 30 minutes. The cool solution is diluted with water and filtered. Recrystallization of the solid gives 3β,21-dihydroxy-20α-methylaminoallopregnan-11-one.

Example 9

A mixture of 17.3 g. of 3α-hydroxy-16α-methyl-11,20-pregnanedione and 0.5 g. of platinum oxide in 200 ml. of ethanol containing about 10% w/w of methylamine is hydrogenated until the theoretical hydrogen absorption has occurred. The catalyst is filtered off and the filtrate is evaporated to dryness. The residue is taken up in chloroform, extracted with dilute acetic acid and the acid extract is made basic with dilute sodium hydroxide. Recrystallization of the separated free base gives 3α-hydroxy-16α-methyl-20α-methylaminopregnan-11-one.

Example 10

To a solution of 11–12 g. of methylamine in 100 ml. of ethanol is added 8.3 g. of 3α,21-dihydroxypregnan-20-one and 0.25 g. of platinum oxide. The mixture is then hydrogenated on the Parr apparatus until the molar equivalent of hydrogen is absorbed. The reaction mixture is filtered, evaporated to dryness and the residue taken up in ether. Anhydrous hydrogen chloride gas is passed into the ether solution to give the hydrochloride salt of the 20-amines which is converted to the free base by treating with dilute alkali and extracting with ether. Removal of the ether and recrystallization of the residue yields 3α,21-dihydroxy-20α-methylaminopregnane.

The above methylaminopregnane (2.0 g.) is refluxed for two hours in an excess of acetic anhydride/acetic acid in the presence of perchloric acid. The 3α,21-diacetoxy derivative is isolated as the perchloric acid salt and is treated with alkali to give the free base, 3α,21-diacetoxy-20α-methylaminopregnane.

Example 11

3β,11α-dihydroxy-20-allopregnanone (16.6 g.) and 0.5 g. of platinum oxide are added to 200 ml. of ethanol containing 10% w/w of methylamine and the mixture is hydrogenated until the theoretical amount of hydrogen is absorbed. The catalyst is filtered off and the filtrate evaporated to dryness. The residual 20-methylamines are further worked up as described in Example 1 to give 3β,16α-dihydroxy-20α-methylaminoallopregnane.

Example 12

A mixture of 8.4 g. of 3β,16α-diacetoxy-20-allopregnanone and 0.3 g. of platinum oxide in a solution of 11–12 g. of methylamine in 100 ml. of ethanol is shaken under hydrogen until the theoretical amount of hydrogen is absorbed. The filtered reaction mixture is evaporated to dryness and the residue is converted to hydrochlorides as described in Example 1. Recovery of the free bases by treatment with dilute alkali and subsequent fractional recrystallization yields 3β,16α-diacetoxy-20α-methylaminoallopregnane.

Example 13

To a solution of 5–6 g. of methylamine in 50 ml. of ethanol is added 3.5 g. of 3β,5α,6β-trihydroxy-20-allopregnanone and 0.1 g. of platinum oxide. The resulting mixture is hydrogenated on the Parr apparatus until the theoretical amount of hydrogen is absorbed. The catalyst is filtered off and the ethanol evaporated. The residue is taken up in dilute hydrochloric acid, made alkaline and the free base extracted into ether. The washed and dried ether extract is concentrated in vacuo to give 3β,-5α,6β-trihydroxy-20-methylaminoallopregnane.

Example 14

To 7.2 g. of 5α-hydroxy-6β-methyl-3,11,20-allopregnantrione in 100 ml. of methanol is added 0.4 g. of sodium borohydride dissolved in pyridine. After 10 minutes an excess of dilute hydrochloric acid is added and the mixture extracted with methylene chloride. Evaporation of the solvent and chromatography of the residue over alumina yields 3β,5α-dihydroxy-6β-methyl-11,20- allopregnandione.

The dione prepared as above (18.0 g.) and 0.5 g. of platinum oxide are added to 200 ml. of ethanol containing 10% w/w of methylamine and the mixture hydrogenated until one mole of hydrogen is absorbed. The catalyst is removed by filtration and the filtrate evaporated to dryness. Treatment of the residue as described in Example 1 yields 3β,5α-dihydroxy-6β-methyl-20α-methylaminoallopregnan-11-one.

Treatment of 1.0 g. of the above methylaminoallopregnanone with an excess of acetic anhydride/acetic acid in the presence of perchloric acid yields the corresponding 3β,5α - diacetoxy - 6β - methyl - 20α - methylaminoallopregnan - 11 - one upon liberation of the free base from the perchloric acid salt.

Example 15

A mixture of 10.4 g. of 3α,6β-diacetoxypregnan-20-one and 0.25 g. of platinum oxide in 100 ml. of ethanol containing 10% w/w of methylamine is hydrogenated until the theoretical hydrogen absorption has occurred. The catalyst is removed and the solvent evaporated in vacuo. The residue comprising the crude 20-methylamines is converted to the hydrochlorides and the pure free bases obtained as described in Example 1. Fractional recrystallization of the free bases gives 3α,6β-diacetoxy-20α-methylaminopregnane.

Example 16

To a solution of 5–6 g. of methylamine in 100 ml. of ethanol is added 6.0 g. of 3β-hydroxy-19-nor-5-pregnen-20-one and 0.2 of platinum oxide and the mixture is hydrogenated until one mole of hydrogen is absorbed. The catalyst is filtered off and the filtrate evaporated to dryness. The residue is taken up in chloroform and extracted with dilute acetic acid. The acid extract is made basic with dilute sodium hydroxide and the free amine isolated. Recrystallization gives 3β-hydroxy-20α-methylamino-19-nor-5-pregnene.

Similarly, hydrogenating 6.8 g. of 3β-acetoxy-19-nor-5-pregnen-20-one with methylamine as described above yields 3β-acetoxy-20α-methylamino-19-nor-5-pregnene.

Example 17

A solution of 3.2 g. of 3β-hydroxy-20α-methylamino-19-nor-5-pregnene (prepared as in Example 16) in 100 ml. of acetic acid is hydrogenated under 2 atmospheres of hydrogen in the presence of 0.2 g. of palladium catalyst until one mole of hydrogen is absorbed. The catalyst is removed and the solution is made basic with sodium hydroxide. The free base is extracted into ether and the dried ether extract evaporated in vacuo to give 3β-hydroxy-20α-methylamino-19-norallopregnane.

Similarly, 3.0 g. of 3β-acetoxy-20α-methylamino-19-nor-5-pregnene (prepared as in Example 16) is hydrogenated as described above to yield 3β-acetoxy-20α-methylamino-19-norallopregnane.

Example 18

An anhydrous solution of 12.0 g. of 3β-hydroxy-19-nor-5-pregnen-20-one in 250 ml. of benzene and 20 ml. of ethylene glycol is treated with 0.3 g. of p-toluenesulfonic acid monohydrate and then refluxed for four hours with continuous removal of water formed in the reaction. The reaction mixture is washed with sodium bicarbonate solution and water, dried and the solvent removed to give 20,20-ethylenedioxy-3β-hydroxy-19-nor-5-pregnene.

A solution of the above ethylenedioxy derivative (8.7 g.) in 100 ml. of chloroform is treated with 6.8 g. of monoperphthalic acid in 170 ml. of ether. After standing 12 hours at 0° C. the reaction mixture is diluted with an equal volume of ether and washed with aqueous potassium carbonate and water until neutral. The dried solution is evaporated to give 20,20-ethylenedioxy-5α,6α-epoxy-3β-hydroxy-19-norallopregnane.

The epoxide prepared as above (5.1 g.) in a mixture of 125 ml. of dry benzene and 200 ml. of ether is added to a solution of methyl magnesium iodide prepared from 3.0 g. of magnesium and 8.0 ml. of methyl iodide in 50 ml. of ether. The mixture is stirred at room temperature for six hours, allowed to stand for 12 hours and then poured into an excess of aqueous ammonium chloride. The organic layer is washed, dried and evaporated. The residue is dissolved in 125 ml. of 90% methanol and 2 g. of oxalic acid is added. The mixture is refluxed for 30 minutes and then concentrated to give 3β,5α-dihydroxy-6β-methyl-19-norallopregnan-20-one.

A mixture of 16.7 g. of the norpregnanone prepared as above and 0.5 g. of platinum oxide in 200 ml. of ethanol containing 22–24 g. of methylamine is shaken under hydrogen until one mole of hydrogen is absorbed. The catalyst is removed and the ethanol evaporated. The residual amines are purified via the hydrochlorides as described in Example 1 and fractionally recrystallized to give 3β-5α-dihydroxy-6β-methyl-20α-methylamino-19-norallopregnane.

Example 19

To a solution of 7.2 g. of 5α,11α-dihydroxy-6β-methyl-3,20-allopregnandione in 200 ml. of methanol is added 0.4 g. of sodium borohydride dissolved in pyridine. After 10 minutes an excess of dilute hydrochloric acid is added and the mixture extracted with methylene chloride. Removal of the solvent and chromatography of the residue over alumina gives 6β-methyl-3β,5α,11α-trihydroxy-20-allopregnanone.

A mixture of 3.6 g. of the allopregnanone prepared as above and 0.1 g. of platinum oxide in 50 ml. of ethanol containing 5–6 g. of methylamine is hydrogenated until the theoretical hydrogen absorption has occurred. The catalyst is removed from the reaction mixture and the ethanol evaporated. The residual amines are purified as described in Example 1 to give 6β-methyl-20α-methylamino-3β,5α,11α-trihydroxyallopregnane.

Example 20

To a solution of methylamine in 100 ml. of ethanol (10% w/w) is added 9.3 g. of 3β-acetoxy-5-pregnen-11,20-dione and 0.25 g. of platinum oxide. The mixture is then hydrogenated until one mole of hydrogen is absorbed. The catalyst is filtered off and the solvent evaporated. The residue is taken up in dilute hydrochloric acid, the acid solution made basic and then extracted with chloroform. By removing the chloroform in vacuo and recrystallization of the residue, 3β-acetoxy-20α-methylamino-5-pregnen-11-one is obtained.

Example 21

A mixture of 10.4 g. of 3β,11β-diacetoxy-5-pregnen-20-one and 0.25 g. of platinum oxide in 100 ml. of ethanol containing 11–12 g. of methylamine is shaken under hydrogen until one mole of hydrogen is absorbed. The catalyst is filtered off, the solvent removed and the residue further worked up as described in Example 20 to yield 3β,11β-diacetoxy-20α-methylamino-5-pregnene.

*Example 22*

To a solution of ethylamine in 200 ml. of ethanol (10% w/w) is added 16.6 g. of 3β-hydroxy-11,20-allopregnandione and 0.5 g. of platinum oxide. The mixture is hydrogenated until the theoretical amount of hydrogen is absorbed and is then filtered. The filtrate is evaporated to dryness and the residue taken up in acetic acid. The acid extract is made basic and isolated by extraction into chloroform. Removal of the chloroform and recrystallization yields 20α-ethylamino-3β-hydroxy-11-allopregnanone.

*Example 23*

A mixture of 9.0 g. of 3β-acetoxy-20-allopregnanone and 0.25 g. of platinum oxide in 100 ml. of ethanol containing 22.0 g. of n-butylamine is hydrogenated at 50 p.s.i. until one mole of hydrogen is absorbed. The reaction mixture is filtered and evaporated to dryness. The residual 20-butylamines are purified via the hydrochlorides as described in Example 1 and recrystallized to give 3β-acetoxy-20α-butylaminoallopregnane.

*Example 24*

A mixture of 8.3 g. of 3α-hydroxypregnan-11,20-dione and 0.25 g. of platinum oxide in 100 ml. of ethanol containing 17.7 g. of isopropylamine is hydrogenated until one mole of hydrogen is absorbed. The catalyst is filtered off and the filtrate evaporated to dryness. The residue is taken up in dilute hydrochloric acid and the acid extracted is made basic. The solid free base is removed and recrystallized to give 3α-hydroxy-20α-isopropylaminopregnan-11-one.

*Example 25*

To a solution of 6.9 g. of 5α-hydroxy-6β-methyl-3,20-allopregnandione in 200 ml. of methanol is added 0.4 g. of sodium borohydride dissolved in pyridine. After 10 minutes an excess of dilute hydrochloric acid is added and the mixture extracted with methylene chloride. Removal of the solvent and chromatography of the residue over alumina gives 3β,5α-dihydroxy-6β-methyl-20-allopregnanone.

A mixture of 7.0 g. of 3β,5α-dihydroxy-6β-methyl-20-allopregnanone and 0.2 g. of platinum oxide in 100 ml. of ethanol containing 11–12 g. of methylamine is shaken under hydrogen until one mole is absorbed. The catalyst is removed and the reaction mixture worked up as in Example 1 to yield 3β,5α-dihydroxy-6β-methyl-20α-methylaminoallopregnane.

*Example 26*

A solution of 100 g. of 3β-hydroxy-11,20-allopregnandione in 1 l. of absolute alcohol containing an excess of methylamine is allowed to stand at room temperature for one hour. Platinum oxide (3.0 g.) is added and the mixture is shaken with hydrogen at atmospheric pressure until one mole of hydrogen is absorbed. The catalyst is removed by filtration and the filtrate is taken to dryness in vacuo. The solid syrup obtained is suspended in acetone and filtered. The solid is dissolved in glacial acetic acid, diluted with a large volume of water and extracted with ether. The aqueous layer is adjusted to pH 11 with 40% sodium hydroxide solution. The solid which precipitated is filtered and dried in vacuo over phosphorus pentoxide. The pure product 3β-hydroxy-20-methylamino-11-allopregnanone is obtained by recrystallization from toluene, M.P. 187–189° C. $[\alpha]_D^{25} = 55.9°$ (c=1.00 in chloroform).

*Example 27*

Fifteen grams of 3α-hydroxypregnan-11,20-dione is dissolved in 200 ml. of ethanol containing 15–20 g. of methylamine, and the clear solution is allowed to stand for five hours. It is then shaken with 1.0 g. of platinum oxide catalyst and hydrogen at an initial pressure of 50 p.s.i. Hydrogenation commences after an induction period of one-half to one hour. When one mole of hydrogen is absorbed, the hydrogenation stops. The catalyst is filtered off and the alcohol is removed on the steam bath, the last traces off in vacuo. The residue is taken up in dilute hydrochloric acid and extracted three times with ether to remove non-basic material. The amine, regenerated by the addition of alkali, is extracted with ether. The ether solution of the amine is washed twice with saturated salt solution, dried over sodium sulfate and then concentrated to ca. 50–60 ml. Upon cooling, crystals develop which are filtered and washed with cold ether to yield 3α-hydroxy-20-methylaminopregnan-11-one, M.P. 136–143° C.

*Example 28*

A solution of 12.1 g. of 3β-hydroxy-20-methylamino-11-allopregnanone (prepared as in Example 26) in 600 ml. of chloroform is stirred with 600 ml. of 5% sodium hypochlorite solution for one hour, when the hypochlorite is removed and the treatment is repeated. The chloroform layer is separated, washed with water, dried and evaporated to yield 13.3 g. of colorless solid, 3β-hydroxy-20-(N-methyl-N-chloroamino)-11-allopregnanone.

The N-chloroamine is dissolved in 130 ml. of redistilled trifluoroacetic acid and subjected to ultra-violet irradiation under nitrogen atmosphere for 40 minutes. The trifluoroacetic acid is evaporated in vacuo and the residual 3β-hydroxy-18-chloro-20-methylamino-11-allopregnanone is dissolved in 150 ml. of methanol, made strongly basic with 25% methanolic potassium hydroxide solution and refluxed for one hour. The solution is concentrated in vacuo, poured into 1000 ml. of water and extracted with chloroform. The residue obtained from evaporation of the washed, dried chloroform solution is boiled for two hours with 25 ml. of acetic anhydride, poured into 500 ml. of water and filtered. The clear filtrate is made alkaline in the cold to pH 11 and extracted with chloroform. The chloroform layer is washed with water, dried and evaporated to give 3β-acetoxy-11-ketoconanine. Recrystallization from ethanol affords colorless needles, M.P. 186–189° C., $[\alpha]_D^{25} = 83.0°$ (c=1.00).

To a solution of 6.3 g. of 3β-acetoxy-11-ketoconanine in 600 ml. of ether is added under exclusion of moisture a dry solution of 6.3 g. of cyanogen bromide in 100 ml. of ether and the reaction is maintained at 27° C. for 90 hours. The ether is boiled off and the residue is dissolved in 20 ml. of glacial acetic acid, diluted with 200 ml. of water and extracted into chloroform. The chloroform extract is washed with water, 10% sodium hydroxide solution and water, dried and evaporated. The residue is recrystallized from ethyl acetate to give 3β-acetoxy-11-keto-N-cyanonorconanine as colorless prisms, M.P. 218–220° C., $[\alpha]_D^{25} + 104°$ (c=1.00 in chloroform).

A solution of 3.5 g. of 3β-acetoxy-11-keto-N-cyanonorconanine in 75 ml. of 95% alcohol containing 11.0 g. of potassium hydroxide is boiled for 40 hours and poured into 800 ml. of water. The product is extracted into chloroform and the chloroform solution stirred with two 100 ml. portions of 5% sodium hypochlorite solution, each time for thirty minutes. The residue from evaporation of the washed dried chloroform layer is treated with methanol and then recrystallized from aqueous methanol to give 3β-hydroxy-11-keto-N-chloronorconanine as colorless needles, M.P. 270° C. dec., $[\alpha]_D^{25} + 98.9°$ (c=1.00 in chloroform).

A solution of 5.0 g. of potassium hydroxide and 2.0 g. of 3β-hydroxy-11-keto-N-chloronorconanine in 25 ml. of methanol is boiled under reflux for one hour, poured into 500 ml. of water and extracted with chloroform. The washed, dried chloroform solution is evaporated to give $3\beta$-hydroxy-11-keto-$\Delta^{20,N}$-18,20-iminoallopregnene which is recrystallized from ethyl acetate to give yellow prisms, M.P. 238–241° C., $[\alpha]_D^{25}+61.7$ (c=1.00 in chloroform).

A stirred solution of 1.0 g. of $3\beta$-hydroxy-11-keto-$\Delta^{20,N}$-18,20-iminoallopregnene in 2 ml. of glacial acetic acid and 9 ml. of water is treated dropwise at 0° C. with a solution of 0.5 g. of sodium nitrite in 2 ml. of water. Nitrogen evolves and the mixture is allowed to stand for 18 hours at 27° C. The solid precipitate is filtered and recrystallized from ethyl acetate and then aqueous acetone to yield colorless crystals of $3\beta$-18-dihydroxy-11,20-allopregnanedione, M.P. 110–115° C., 200° C. The dihydroxydione is in equilibrium with the corresponding 18,20-hemiketal structure.

Example 29

A solution of 6.0 g. of $3\alpha$-hydroxy-20-methylaminopregnan-11-one (prepared as in Example 27) in 300 ml. of chloroform is stirred with 300 ml. of 5% sodium hypochlorite solution for one hour. The hypochlorite is removed and the treatment repeated. The chloroform layer is separated, washed with water, dried and evaporated to give $3\alpha$-hydroxy-20-(N-methyl-N-chloroamino)pregnan-11-one.

The above N-chloroamine (6.6 g.) is dissolved in 65 ml. of redistilled trifluoroacetic acid and irridiated with ultra-violet light under nitrogen for 40 minutes. The trifluoroacetic acid is evaporated in vacuo and the residual $3\alpha$-hydroxy-18-chloro-20-methylaminopregnan-11-one is dissolved in 75 ml. of methanol, made strongly basic with 25% methanolic potassium hydroxide. The solution is refluxed for one hour, concentrated in vacuo, poured into 500 ml. of water and extracted with chloroform. The chloroform extract is washed, dried and evaporated. The residue is boiled for two hours with 12.5 ml. of acetic anhydride, poured into 250 ml. of water and filtered. The filtrate is adjusted to pH 11 and extracted with chloroform. The extract is washed, dried and evaporated to give $3\alpha$-acetoxy-11-keto-$5\beta$-conanine.

To a solution of 6.3 g. of $3\alpha$-acetoxy-11-keto-$5\beta$-conanine in 600 ml. of ether is added in a moisture free atmosphere a dry solution of 6.3 g. of cyanogen bromide in 100 ml. of ether. The mixture is maintained at 27° C. for 90 hours and then the ether is boiled off. The residue is dissolved in 20 ml. of glacial acetic acid, diluted with 200 ml. of water and extracted into chloroform. The extract is washed successively with water, 10% sodium hydroxide and water, and then dried and evaporated. The residue is recrystallized to give $3\alpha$-acetoxy-11-keto-$5\beta$-N-cyanonorconanine.

A solution of 7.0 g. of the above conanine derivative in 150 ml. of 95% alcohol containing 22.0 g. of potassium hydroxide is boiled for 40 hours and then poured into 1.5 l. of water. The mixture is extracted with chloroform and the extract is stirred with two 200 ml. portions of 5% sodium hypochlorite solution, each time for 30 minutes. The chloroform layer is washed, dried and evaporated to give the residual $3\alpha$-hydroxy-11-keto-$5\beta$-N-chloronorconanine.

A solution of 2.5 g. of potassium hydroxide and 1.0 g. of $3\alpha$-hydroxy-11-keto-$5\beta$-N-chloronorconanine in 15 ml. of methanol is refluxed for one hour. The reaction mixture is poured into 250 ml. of water and extracted with chloroform. The washed, dried chloroform extract is evaporated to give $3\alpha$-hydroxy-11-keto-$\Delta^{20,N}$-18,20-iminopregnene.

A solution of 2.0 g. of $3\alpha$-hydroxy-11-keto-$\Delta^{20,N}$-18,20-iminopregnene in 4 ml. of glacial acetic acid and 18 ml. of water is stirred and treated dropwise at 0° C. with a solution of 1.0 g. of sodium nitrite in 4 ml. of water. The mixture is allowed to stand for 18 hours at 27° C. The solid precipitate is filtered and recrystallized to yield $3\alpha,18$-dihydroxypregnan-11,20-dione which is in equilibrium with the corresponding 18,20-hemiketal.

Example 30

$3\beta$-acetoxy-$20\alpha$-methylaminoallopregnane (27.4 g.) prepared as in Example 1 is dissolved in 300 ml. of chloroform and treated with two 500 ml. portions of 5.25% aqueous sodium hypochlorite solution over a 30 minute interval. The organic phase is separated and washed with two 150 ml. portions of water and dried over anhydrous sodium sulfate. Evaporation of chloroform under reduced pressure produces white crystalline $3\beta$-acetoxy-$20\alpha$-methylchloroaminoallopregnane, M.P. ca. 295° C.

To 250 ml. of trifluoroacetic acid cooled to 0° C. is added in small portions 29.9 g. of the above $3\beta$-acetoxy-$20\alpha$-methylchloroaminoallopregnane. The resulting solution is transferred to a flask equipped with a magnetic stirrer and nitrogen is bubbled through for 15 minutes. The oxygen free solution is then irradiated with three G.E. 15 w. Germicidal lamps. Water cooling of the bottom portion of the flask is maintained throughout the irradiation. At the end of each 30 minute interval, 5 drops of reaction solution are removed and added to 5 ml. of 5% potassium iodide-acetone-water solution to determine the qualitative color change (a similar sample is removed before irradiation and treated similarly to produce a dark red color standard). At the end of 130 minutes, the testing procedure produces an almost colorless solution indicating completion of the reaction. The trifluoroacetic acid is removed under vacuum with provisions made for recovering the acid. The residue obtained from this evaporation is treated with 200 ml. of methanol and sufficient 25% potassium-hydroxide methanol solution to raise the pH to 10–12 (150 ml.). The solution is refluxed for one hour on a steam bath. The solution is then concentrated to about 30 ml. and poured into 2400 ml. of water and extracted with 1.5 l. of chloroform. Evaporation of the chloroform under reduced pressure results in a red-gum which when triturated with acetone crystallizes to a solid mass. This solid is recrystallized from 550 ml. of acetone to yield $3\beta$-hydroxyconanine.

Forty grams of $3\beta$-hydroxyconanine and 72 ml. of acetic anhydride are refluxed for two hours. The warm solution is poured into 700 ml. of water and after the anhydride is hydrolyzed, supercel is added and the mixture filtered. The filtrate is made basic and extracted with chloroform. The chloroform extract is washed with sodium carbonate solution and water, dried and evaporated. The residue is recrystallized from acetone to yield $3\beta$-acetoxyconanine, M.P. 164.5–168° C.

A solution of 25.0 g. of $3\beta$-acetoxyconanine and 26.0 g. of cyanogen bromide in 1500 ml. of ether is allowed to stand at room temperature for four days. The mixture is filtered to remove 4.0 g. of 3-acetoxyconanine methobromide. The ether filtrate is extracted with dilute acetic acid to remove a small amount of unreacted starting material. After washing the ether solution with sodium carbonate solution and drying, the solvent is removed and the residue recrystallized from ethyl acetate to yield $3\beta$-acetoxy-N-cyanonorconanine, M.P. 178–181.5° C.

Ten grams of $3\beta$-acetoxy-N-cyanonorconanine and 105 g. of potassium hydroxide in 700 ml. of alcohol are refluxed for 48 hours. The solution is diluted with several volumes of water and the solid collected. Recrystallization of the solid from acetone gives $3\beta$-hydroxynorconanine, M.P. 169–172° C.

A chloroform solution of the above prepared $3\beta$-hydroxynorconanine is stirred with 100 ml. of 5% sodium hypochlorite for one-half hour, when the hypochlorite is removed and the treatment is repeated. The chloroform layer is separated, washed with water, dried and evaporated to yield a residual syrup. The residual syrup is crystallized from 15 ml. of acetonitrile to give $3\beta$- hydroxy-N-chloronorconanine as colorless needles which after recrystallization melts at 111–114° C., resolidifies M.P. 268° C. dec., $[\alpha]_D^{25}$ +96.8° (c=1.00 chloroform).

3β-hydroxy-N-chloronorconanine, prepared from 7.2 g. of 3β-hydroxynorconanine, and 10.0 g. of sodium methoxide in 500 ml. of methanol are refluxed for about one hour. The solution is concentrated in vacuo, diluted with water and extracted into chloroform. The chloroform solution is washed, dried and evaporated and the residue is recrystallized from acetone to give the product, 3β-hydroxy-$\Delta^{20,N}$-18,20-iminoallopregnene, M.P. 180–182.5° C.

A stirred solution of 2.0 g. of 3β-hydroxy-$\Delta^{20,N}$-18,20-iminoallopregnene in 4 ml. of glacial acetic acid and 18 ml. of water is treated dropwise at 0° C. with a solution of 1.0 g. of sodium nitrite in 4 ml. of water. Nitrogen evolves and the mixture is allowed to stand for 18 hours at 27° C. The precipitate is filtered and recrystallized to give 3β,18-dihydroxy-20-allopregnanone which is in equilibrium with the corresponding 18,20-hemiketal.

*Example 31*

A solution of 13.3 g. of 3α-hydroxy-20α-methylaminopregnane (prepared as in Example 3) in 200 ml. of chloroform is stirred with 300 ml. of 5% sodium hypochlorite solution for one-half hour, when the hypochlorite is removed and the treatment is repeated. The chloroform layer is separated, washed with water, dried and evaporated to yield a white amorphous solid, 3α-hydroxy-20α-methylchloroaminopregnane, M.P. 119–123° C.

This chloroamine (8.4 g.) is dissolved in 80 ml. of redistilled trifluoroacetic acid and subjected to ultra-violet irradiation under nitrogen atmosphere for 45 minutes. The trifluoroacetic acid is evaporated in vacuo and the residual oil is dissolved in 200 ml. of methanol made strongly basic with 25% methanolic potassium hydroxide solution. The solution is refluxed for one hour, concentrated in vacuo, poured into 300 ml. of water and extracted with chloroform. The residue obtained from evaporation of the washed, dried chloroform solution is boiled for two hours with 20.8 ml. of acetic anhydride, poured into 500 ml. of water and filtered. The clear filtrate is made alkaline in the cold to pH 11 and extracted with chloroform. The chloroform layer is washed with water, dried and evaporated to give a residual oil. A 1.0 g. sample of this residual oil is removed, dissolved in ether, and treated with ethereal hydrogen chloride until acid. The white hydrochloride salt precipitates out and is filtered to yield 1.1 g. of salt. The salt is dissolved in a very small volume of alcohol and cooled to yield a crystalline solid which is recrystallized from alcohol-ether to yield 3α-acetoxy-5β-conanine hydrochloride, M.P. 295° C. dec. $[\alpha]_D^{20}$+47.4° (c=1.00 chloroform).

To a solution of 6.1 g. of 3α-acetoxy-5β-conanine in 600 ml. of ether is added under exclusion of moisture a dry solution of 6.1 g. of cyanogen bromide in 100 ml. of ether. The reaction is maintained at 27° C. for 90 hours. The ether is removed and the residue is dissolved in 20 ml. of glacial acetic acid, diluted with 200 ml. of water and extracted into chloroform. The chloroform extract is washed with water, 10% sodium hydroxide solution and water, dried, and evaporated to give 3α-acetoxy-5β-N-cyanonorconanine.

The cyanonorconanine (6.2 g.) is dissolved in 150 ml. of alcohol containing 19.5 g. of potassium hydroxide and refluxed for 40 hours. The cooled solution is poured into one liter of water and extracted with chloroform. The chloroform layer is separated and washed with water until neutral.

The washed chloroform solution containing the 3α-hydroxy-5β-N-norconanine is stirred with 200 ml. of 5% sodium hypochlorite for one-half hour, when the hypochlorite is removed and the treatment is repeated. The chloroform layer is separated, washed with water, dried and evaporated to yield 7.3 g. of a yellow oil. The oil is dissolved in 75 ml. of methanol and treated with 25% methanolic potassium hydroxide until strongly alkaline. After refluxing for one hour, the solution is concentrated and poured into 400 ml. of water, extracted with chloroform, washed, and dried over sodium sulfate. Evaporation of the chloroform in vacuo produces an oil which crystallizes upon trituration with acetone to yield 3α-hydroxy-$\Delta^{20,N}$-18,20-iminopregnene, M.P. 218–224° C.

A solution of 1.0 g. of the above iminopregnene in 2 ml. of glacial acetic acid and 9 ml. of water is stirred and a solution of 0.5 g. of sodium nitrate in 2 ml. of water is added dropwise at 0° C. The mixture is allowed to stand at room temperature for 18 hours and the precipitate is filtered to give the product, 3α,18-dihydroxypregnan-20-one. The product exists in equilibrium with the corresponding 3α,20-dihydroxypregnan-18,20-hemiketal.

What is claimed is:

1. The method of forming 20-alkylamino steroids having the following formula:

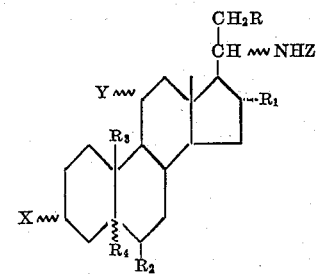

in which $\xi$ is a configurational position selected from the group consisting of α and β; X is a member selected from the group consisting of hydrogen, hydroxy and acyloxy; Y is a member selected from the group consisting of hydrogen, hydroxy, acyloxy and keto; R and $R_4$ are members selected from the group consisting of hydrogen, hydroxy and acyloxy; $R_1$ and $R_2$ are members selected from the group consisting of hydrogen, hydroxy, acyloxy and methyl; $R_3$ is a member selected from the group consisting of hydrogen and methyl; and Z is lower alkyl; each of said acyloxy moieties having a maximum of six carbon atoms; which comprises hydrogenating a 20-keto steroid having the following formula:

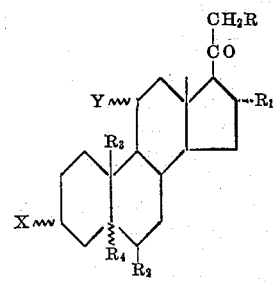

in which $\xi$, X, Y, R, $R_1$, $R_2$, $R_3$ and $R_4$ are as defined above, in the presence of a lower alkyl amine and a hydrogenation catalyst selected from the group consisting of platinum and nickel catalysts.

2. The method in accordance with claim 1 in which the lower alkyl amine is methyl amine.

3. The method in accordance with claim 1 in which the hydrogenation catalyst is platinum oxide.

4. The method of forming 20-alkylamino steroids having the following formula:

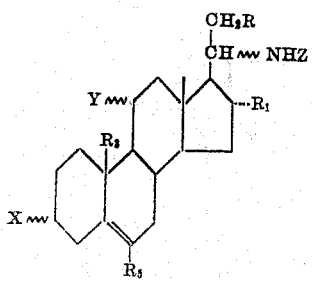

in which ⸱ is a configurational position selected from the group consisting of α and β; X is a member selected from the group consisting of hydrogen, hydroxy and acyloxy; Y is a member selected from the group consisting of hydrogen, hydroxy, acyloxy and keto; R is a member selected from the group consisting of hydrogen, hydroxy and acyloxy; $R_1$ is a member selected from the group consisting of hydrogen, hydroxy, acyloxy and methyl; $R_3$ and $R_5$ are members selected from the group consisting of hydrogen and methyl; and Z is lower alkyl; each of said acyloxy moieties having a maximum of six carbon atoms, which comprises hydrogenating a 20-keto steroid having the following formula:

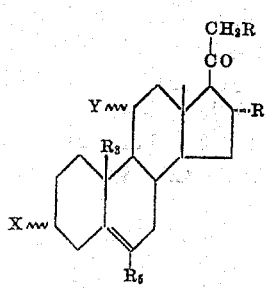

in which ⸱, X, Y, R, $R_1$, $R_3$ and $R_5$ are as defined above, in the presence of a lower alkyl amine and a hydrogenation catalyst selected from the group consisting of platinum and nickel catalysts.

5. The method in accordance with claim 4 in which the lower alkyl amine is methyl amine.

6. The method in accordance with claim 4 in which the hydrogenation catalyst is platinum oxide.

7. A compound having the formula:

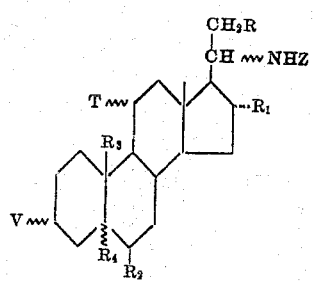

in which ⸱ is a configurational position selected from the group consisting of α and β; V is a member selected from the group consisting of hydroxyl and acyloxy; T is a member selected from the group consisting of keto, hydroxy and acyloxy; R and $R_4$ are members selected from the group consisting of hydrogen, hydroxy and acyloxy; $R_1$ and $R_2$ are members selected from the group consisting of hydrogen, hydroxy, acyloxy and methyl; $R_3$ is a member selected from the group consisting of hydrogen and methyl; and Z is lower alkyl; each of said acyloxy moieties having a maximum of six carbon atoms.

8. A compound having the formula:

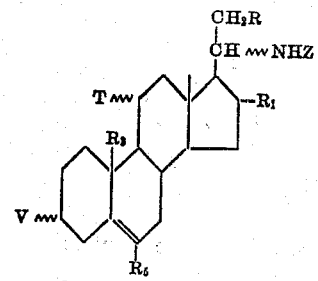

in which ⸱ is a configurational position selected from the group consisting of α and β; V is a member selected from the group consisting of hydroxyl and acyloxy; T is a member selected from the group consisting of keto, hydroxy and acyloxy; R is a member selected from the group consisting of hydrogen, hydroxy and acyloxy; $R_1$ is a member selected from the group consisting of hydrogen, hydroxy, acyloxy and methyl; $R_3$ and $R_5$ are members selected from the group consisting of hydrogen and methyl; and Z is lower alkyl; each of said acyloxy moieties having a maximum of six carbon atoms.

9. A compound having the formula:

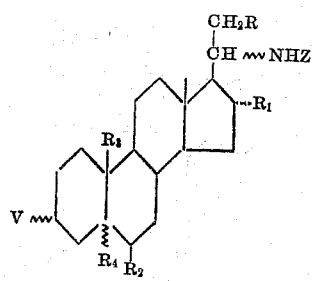

in which ⸱ is a configurational position selected from the group consisting of α and β; V is a member selected from the group consisting of hydroxy and acyloxy; R and $R_4$ are members selected from the group consisting of hydrogen, hydroxy and acyloxy; $R_1$ and $R_2$ are members selected from the group consisting of hydrogen, hydroxy, acyloxy and methyl; $R_3$ is a member selected from the group consisting of hydrogen and methyl; Z is lower alkyl; and with one of the substituents R, $R_1$, $R_2$ and $R_4$ being a member selected from the group consisting of hydroxy and acyloxy; each of said acyloxy moieties having a maximum of six carbon atoms.

10. A compound having the formula:

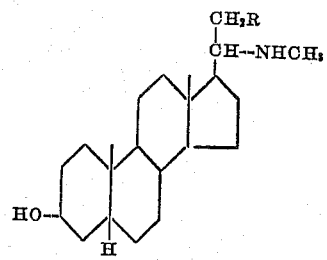

11. A compound having the formula:

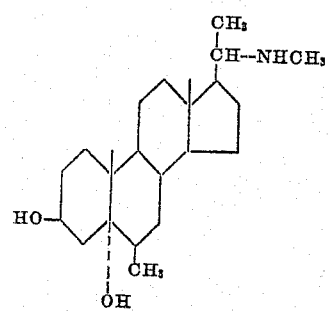

12. A compound having the formula:
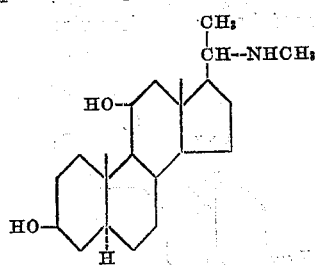
13. A compound having the formula:
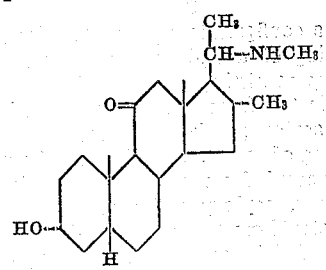
14. A compound having the formula:
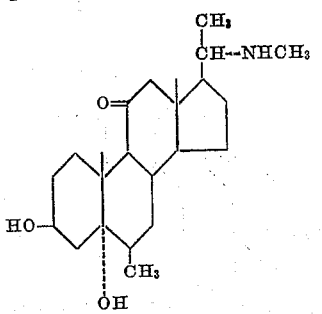
15. A compound having the formula:
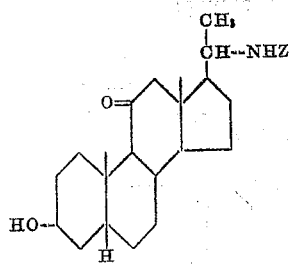
in which Z is lower alkyl.
16. A compound having the formula:
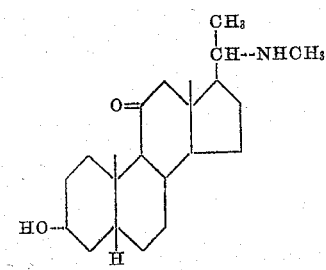
References Cited in the file of this patent
UNITED STATES PATENTS
2,582,258    Julian et al. _____ Jan. 15, 1952
2,606,911    Julian et al. _____ Aug. 12, 1952
OTHER REFERENCES
Buchschacher et al.: J.A.C.S., Vol. 80, pages 2904–6 (June 5, 1958).